US012698207B2

(12) United States Patent
Fathi et al.

(10) Patent No.: US 12,698,207 B2
(45) Date of Patent: Aug. 4, 2026

(54) METHODS FOR FORMING GAS PRODUCTS FROM HYDROCARBON FEEDS

(71) Applicant: Saudi Arabian Oil Company, Dhahran (SA)

(72) Inventors: Mazin M. Fathi, Dhahran (SA); Mohammed R. Dossary, Dhahran (SA); Faisal M. Mulla, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 655 days.

(21) Appl. No.: 18/297,040

(22) Filed: Apr. 7, 2023

(65) Prior Publication Data

US 2024/0336479 A1      Oct. 10, 2024

(51) Int. Cl.
C01B 3/40              (2006.01)

(52) U.S. Cl.
CPC ........ C01B 3/40 (2013.01); *C01B 2203/0227* (2013.01); *C01B 2203/0495* (2013.01); *C01B 2203/1023* (2013.01); *C01B 2203/1058* (2013.01); *C01B 2203/1247* (2013.01); *C01B 2203/148* (2013.01); *C01B 2203/1614* (2013.01); *C01B 2203/1628* (2013.01)

(58) Field of Classification Search
CPC .............. C01B 3/40; C01B 2203/0227; C01B 2203/0495; C01B 2203/1023; C01B 2203/1058; C01B 2203/1247; C01B 2203/148; C01B 2203/1614; C01B 2203/1628
See application file for complete search history.

(56) References Cited

U.S. PATENT DOCUMENTS

| | | | |
|---|---|---|---|
| 4,220,518 | A | 9/1980 | Uchida et al. |
| 4,647,367 | A | 3/1987 | Urban et al. |
| 9,481,833 | B2 | 11/2016 | Maschmeyer |
| 9,505,678 | B2 | 11/2016 | Choi et al. |
| 9,902,908 | B2 | 2/2018 | Iversen |
| 9,951,283 | B2 | 4/2018 | Choi et al. |
| 10,011,790 | B2 | 7/2018 | Choi et al. |

(Continued)

FOREIGN PATENT DOCUMENTS

| | | | |
|---|---|---|---|
| CN | 106190313 A | 12/2016 | |
| WO | WO-03051770 A1 * | 6/2003 | .............. B01J 3/008 |

OTHER PUBLICATIONS

M.J. Macias, J. Ancheyta, Simulation of an isothermal hydrodesulfurization small reactor with different catalyst particle shapes, 2004, Catalysis Today 98, 243-252 (Year: 2004).*

(Continued)

*Primary Examiner* — Daniel Berns
*Assistant Examiner* — Joshua Maxwell Speer
(74) *Attorney, Agent, or Firm* — Dinsmore & Shohl, LLP

(57) ABSTRACT

A gas product may be formed from a hydrocarbon feed by a method that may comprise introducing water to a reactor, wherein the reactor comprises a lobular catalyst, introducing the hydrocarbon feed to the reactor, and contacting the hydrocarbon feed, the water, and the lobular catalyst within the reactor, such that at least a portion of the hydrocarbon feed is reacted to form a gas product. The water in the reactor may be at a temperature and pressure such that the water is a supercritical fluid. At least 20 wt. % of the hydrocarbon feed may be converted to the gas product in the reactor.

21 Claims, 7 Drawing Sheets

(56) References Cited

U.S. PATENT DOCUMENTS

| 10,106,748 | B2 | 10/2018 | Choi et al. |
| 10,703,999 | B2 | 7/2020 | Choi et al. |
| 10,752,847 | B2 | 8/2020 | Choi et al. |
| 10,927,312 | B2 | 2/2021 | Choi et al. |
| 10,995,281 | B2 | 5/2021 | Choi et al. |
| 2023/0285949 | A1 | 9/2023 | Fathi et al. |

OTHER PUBLICATIONS

Translation of WO_03051770 (Year: 2003).*

* cited by examiner

400

365

370

370

370

300

360

355

METHODS FOR FORMING GAS PRODUCTS FROM HYDROCARBON FEEDS

TECHNICAL FIELD

This disclosure relates processing of hydrocarbon feeds and, more specifically, to methods as systems for processing hydrocarbon feeds utilizing supercritical water.

BACKGROUND

Industrial gases, such as hydrogen and methane, have high value in industry. However, conventional processes for producing such industrial gases have limitations. For example, the conventional gasification process uses partial oxidation to convert carbonaceous materials (e.g. coal, petroleum, biofuel, or biomass) with oxygen into synthesis gas. The main advantages of such gasification processes are the production of hydrogen, chemicals, and fuels, therefore reducing carbon footprint. However, the typical operating conditions of conventional gasification process are extreme, such as 60 bars and 1300° C. to 1700° C.

BRIEF SUMMARY

As industrial gases such as hydrogen have high demand, alternative methods for producing industrial gases are needed. Described herein are methods for converting hydrocarbon feeds into gases, such as hydrogen. The methods described herein utilize a specialized lobular catalyst in combination with water at supercritical conditions. As is demonstrated herein, such a method may convert a hydrocarbon feed into at least 20 wt. % gas product, and in some embodiments as at least 5 wt. % hydrogen.

According to one or more embodiments of the present disclosure, a gas product may be formed from a hydrocarbon feed by a method that may comprise introducing water to a reactor, wherein the reactor comprises a lobular catalyst, introducing the hydrocarbon feed to the reactor, and contacting the hydrocarbon feed, the water, and the lobular catalyst within the reactor, such that at least a portion of the hydrocarbon feed is reacted to form a gas product. The water in the reactor may be at a temperature and pressure such that the water is a supercritical fluid. At least 20 wt. % of the hydrocarbon feed may be converted to the gas product in the reactor.

It is to be understood that both the preceding general description and the following detailed description describe various embodiments and are intended to provide an overview or framework for understanding the nature and character of the claimed subject matter. Additional features and advantages of the embodiments will be set forth in the detailed description and, in part, will be readily apparent to persons of ordinary skill in the art from that description, which includes the accompanying drawings and claims, or recognized by practicing the described embodiments. The drawings are included to provide a further understanding of the embodiments and, together with the detailed description, serve to explain the principles and operations of the claimed subject matter. However, the embodiments depicted in the drawings are illustrative and exemplary in nature, and not intended to limit the claimed subject matter.

BRIEF DESCRIPTION OF THE DRAWINGS

The following detailed description of specific embodiments of the present disclosure can best be understood when read in conjunction with the following drawings, where like structure is indicated with like reference numerals and in which.

Figure 1:
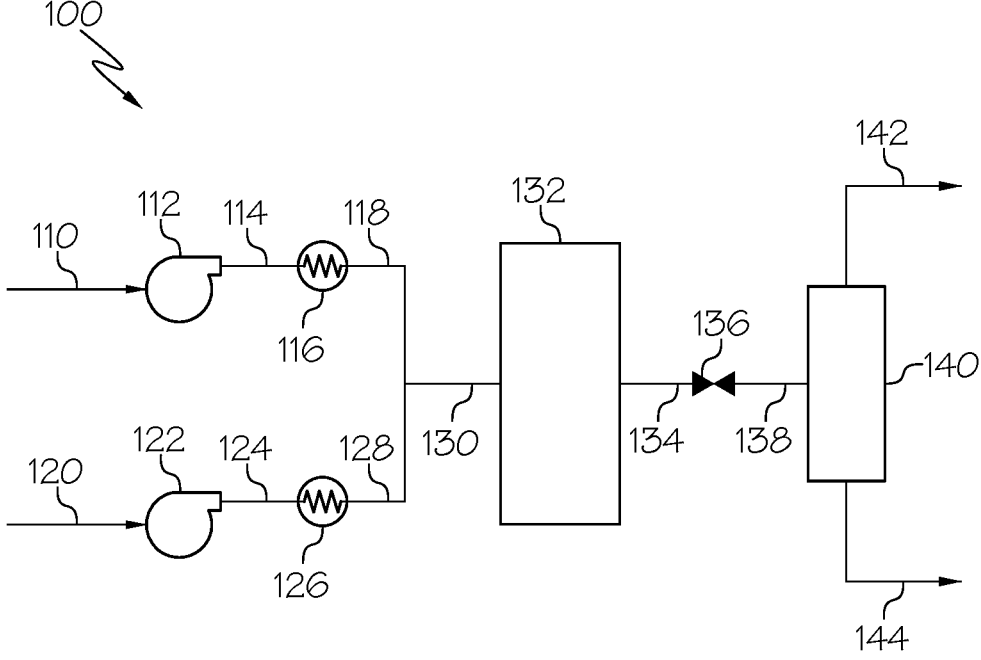
FIG. 1 is a process flow diagram of a supercritical water reactor process utilizing catalysts, according to one or more embodiment described herein.

For the purpose of the simplified schematic illustrations and descriptions of process flow figures, the numerous valves, temperature sensors, electronic controllers and the like that may be employed and well known to those of ordinary skill in the art of certain chemical processing operations are not included. Further, accompanying components that are often included in conventional chemical processing operations, such as refineries, such as, for example, air supplies, catalyst hoppers, and flue gas handling are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which may exit the depicted system or a system inlet stream which may enter the depicted system. Product streams may be further processed in accompanying chemical processing systems or may be commercialized as end products. System inlet streams may be streams transferred from accompanying chemical processing systems or may be non-processed feedstock streams. Additionally, dashed or dotted lines may signify an optional step or stream. For example, recycle streams in a system may be optional. However, it should be appreciated that not all solid lines may represent required transfer lines or chemical streams.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Described herein are methods for forming gas products, such as hydrogen, from hydrocarbon feeds. Generally, the methods described herein utilize supercritical water as well as a fixed bed, lobular shaped catalyst. The advantages of such methods, such as relatively high conversion of hydrocarbon feeds into gas products is described in detailed herein.

Referring to FIG. 1, process flow diagram for one embodiment of a supercritical water system 100 is shown. While the methods described herein are described in the context of FIG. 1, it is contemplated that other systems may be suitable for performing the processes and other disclosed concepts of the present disclosure. In FIG. 1, water 110 may be pressurized in water pump 112 generating pressurized water 114. Pressurized water 114 may be heated in water heater 116, generating heated water 118. In embodiments describe herein, the heated water 118 may be in a supercritical condition, referred to sometimes herein as supercritical water. The supercritical water may be in a supercritical state before and after injection into the supercritical water reactor 132.

As describe herein, a "supercritical water" refers to water at a pressure and a temperature greater than that of its critical pressure and critical temperature, 22.064 MPa and 374° C. respectively. At a temperature and pressure greater than the critical temperature and pressure, the liquid and gas phase boundary may disappear, and the supercritical water may have characteristics of both liquid and gaseous substances. Without intending to be bound by theory, supercritical water may be a good reaction medium for the gasification of hydrocarbons because supercritical water may have good miscibility with hydrocarbons and the "cage effect" may stabilize radicals formed during the gasification process to suppress the recombination of the radicals.

In one or more embodiments, the supercritical water may be at a temperature greater than the critical temperature of water, 374° C., such as from 357° C. to 800° C., from 500° C. to 780° C. In additional embodiments, the supercritical water may have a temperature of from 375° C. to 400° C., from 400° C. to 500° C., from 500° C. to 600° C., from 600° C. to 700° C., from 700° C. to 800° C., or any combination or subset of these ranges.

In one or more embodiments, the supercritical water may be at a pressure greater that the critical pressure of water, 22.064 MPa. In one or more embodiments, supercritical water may have a pressure from 22 MPa to 40 MPa, or from 25 MPa to 28 MPa. For example, the supercritical water may have a pressure from 22 MPa to 25 MPa, from 25 MPa to 30 MPa, from 30 MPa to 35 MPa, from 35 MPa to 40 MPa, or any combination or subset of these ranges.

Still referring to FIG. 1, hydrocarbon feed 120 may be pressurized in feed pump 122, generating pressurized feed 124. Pressurized feed 124 may be heated in feed heater 126 generating heated feed 128. In some embodiments, heated feed 128 may be at temperatures and pressures at or near supercritical water conditions.

According to embodiments described herein, hydrocarbon feed 120 can include any hydrocarbons, including oil, heavy hydrocarbon oils, whole range crude oil, crude oil fractions, topped crude oil, residual oil, decant oil from fluid catalytic cracking, pyrolysis oil, steam cracking process streams, conventional refinery process streams, petrochemical plant process streams, hydrocarbons from gas to liquid processes, hydrocarbons from biomass liquefaction processes, hydrocarbons from coal liquefaction processes, hydrocarbons from plastics, combinations of the same, and any other hydrocarbon streams known in the art.

According to some embodiments, the hydrocarbon feed 120 may have an API gravity of from 5 degrees to 30 degrees, such as from 10 degrees to 18 degrees, or from 13 degrees to 15 degrees. In additional embodiments, the hydrocarbon feed 120 may have an API gravity of from 5 degrees to 10 degrees, from 10 degrees to 15 degrees, from 15 degrees to 20 degrees, from 20 degrees to 25 degrees, from 25 degrees to 30 degrees, or any combination of these ranges. The hydrocarbon feed 120 may include aromatic content and/or asphaltene, such as at least 1 wt. %, at least 2 wt. %, at least 3 wt. %, at least 4 wt. %, or even at least 5 wt. % of aromatic contents, and such as at least 1 wt. %, at least 2 wt. %, at least 3 wt. %, or at least 4 wt. %, of asphaltene.

Heated water 118 and heated feed 128 may be mixed to form mixed stream 130. Mixed stream 130 may be introduced to supercritical water reactor 132. Supercritical water reactor 132 may generally operate at supercritical water conditions. Supercritical water reactor 132 may allow for reactions to occur between water at supercritical conditions and the hydrocarbon feed, facilitated by the lobular catalyst described later herein. Product 134 may be removed from supercritical water reactor 132.

Figure 3A:
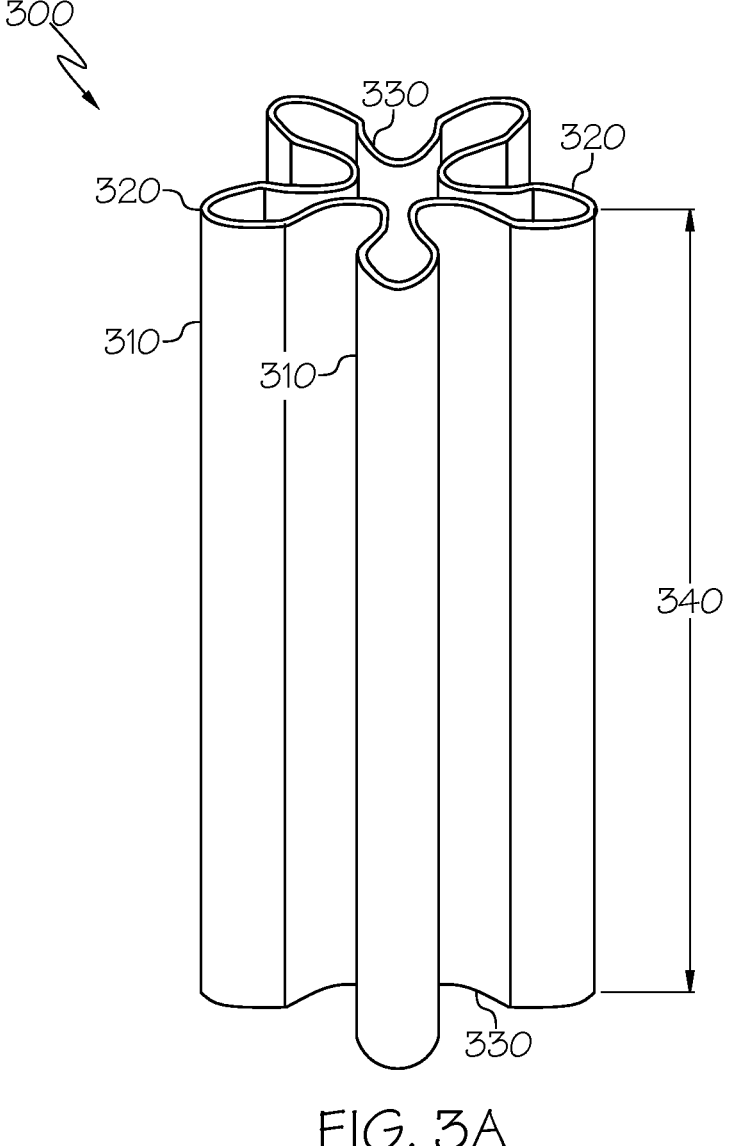
FIG. 3A is a schematic depiction of a lobular catalyst structure, according to one or more embodiment described herein.
Figure 3B:
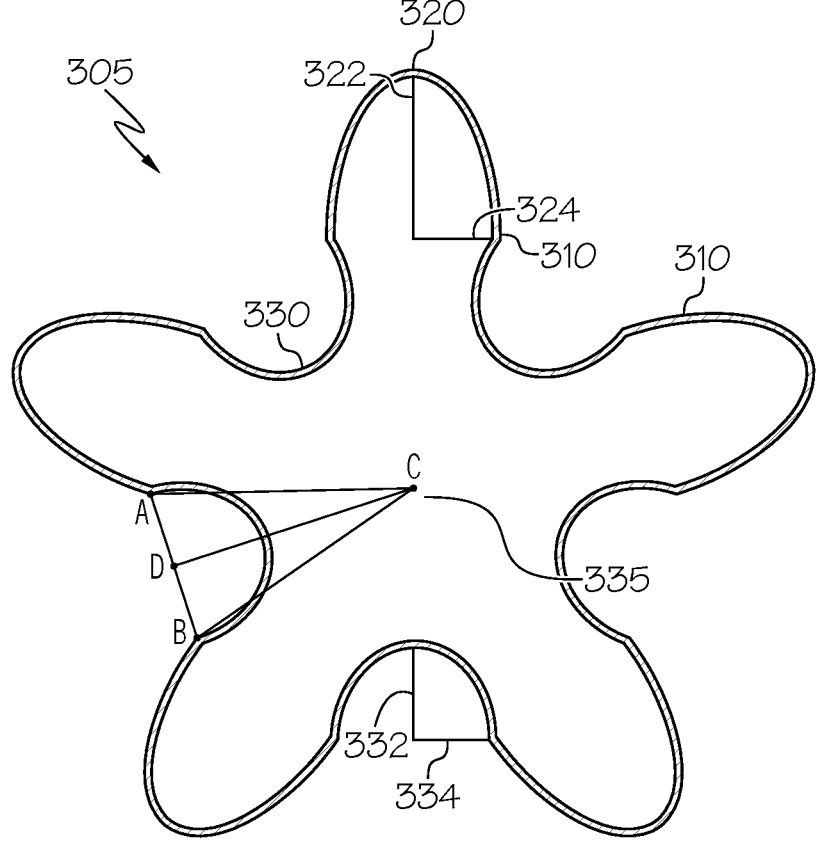
FIG. 3B is a schematic depiction of a cross-section of the lobular catalyst structure, according to one or more embodiment described herein.
Figure 4A:
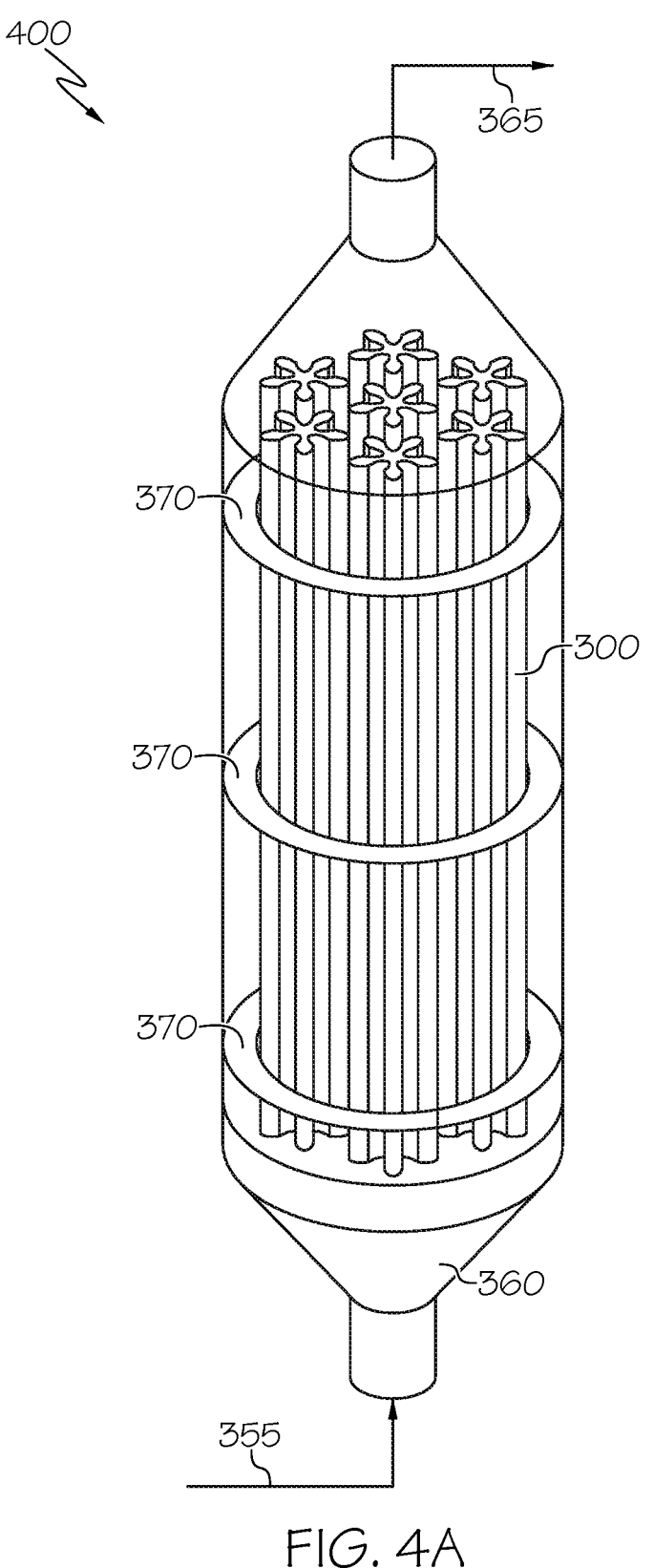
FIG. 4A is a schematic depiction of a reactor that includes a lobular catalyst, according to one or more embodiment described herein.

Referring now to FIG. 4A, reactor 400 is shown, which is an embodiment of a reactor that may be suitable as supercritical water reactor 132 in the embodiment of FIG. 1. Reactor 400 can be any type of reactor capable of processing feed and water at pressures and temperatures corresponding to supercritical water conditions. The reactor 400 may include a lobular catalyst 300, as is described herein in greater detail, such as the embodiments depicted in FIGS. 3A and 3B. The lobular catalyst may facilitate the reactions occurring within the reactor 132 under the supercritical water conditions present. These reactions include upgrading reactions, which convert heavy oil to lighter products such as gases. The catalyst may improve the conversion and product selectivity by facilitating reactions such as cracking, alkylation, dehydrocyclization, cyclization, reforming, aromatization, hydrogenation, hydrocracking, steam reforming, water gas shift, and polymerization. Reactions can be influenced by the catalyst active sites and the operating conditions.

Referring now to FIG. 3A, lobular catalyst structure 300 is shown. The lobular catalyst structure 300 may include five lobes 310, and may be hollow. Each lobe 310 may include an outward segment 320 and inward segment 330. Outward segment 320 and inward segment 330 are semi-ellipsoids. The lobular catalyst structure 300 has height 340. The lobular catalyst structure 300 may not be a particulate, and instead may be developed on a macro-scale, in a shaped plate-like or slab-like structure, formed with a specific cross-section. The lobular catalyst structure 300 can be formed like a shaped tube, with an outer wall and a hollow core. Lobular catalyst structure 300 may not include a porous material. In some embodiments, height 340 approximates the height of the widest or tallest portion of the reactor in which lobular catalyst 300 is installed. In some embodiments, height 340 substantially fills the reactor.

Referring now to FIG. 3B, cross-section 305 of an embodiments of a lobular catalyst structure 300 is shown. The lobular catalyst structure 300 may be hollow. Hollow core 335 may be an aperture through lobular catalyst structure 300 for height 340. Point C is the center point of cross section 305. Outward segment 320 includes outward major radius 322 and outward minor radius 324. Inward segment 330 includes inward major radius 332 and inward minor radius 334. Point A is located at the inflection point where inward segment 330 and outward segment 320 meet. Point B is located directly across from point A on the opposite side of inward segment 330. similarly situated at the inflection point where inward segment 330 and outward segment 320 meet. Point D is the midpoint on the line between point A and point B. In some embodiments, the outward radius ratio of outward major radius 322 to outward minor radius 324 is in the range of 1.5 to 2. In some embodiments, the inward radius ratio of inward major radius 332 to inward minor radius 334 is in the range of 1.5 to 2. In some embodiments, the outward radius ratio and the inward radius ratio are the same. In some embodiments, outward major radius 322 and outward minor radius 324 are the same length. In some embodiments, inward major radius 332 and inward minor radius 334 are the same length. The lower the radii ratios, the lower the coke and solids depositions on the catalyst may be. The higher the radii ratios, the higher the surface area to total catalyst size may be. In some embodiments, the outward and inward major and minor radii lengths are optimized to minimize coke and solids deposition while maximizing the surface area of the catalyst.

According to one or more embodiments, the total volume of the lobular catalyst structure can be approximated by the volume of a regular cyclic equilateral segment polygon when the outward segments 320 and inward segments 330 have similar dimensions. Referring back to FIG. 3A, the volume can be approximated by the Equation 1:

$$V = 5AB * DC * h \qquad \text{Eq. 1}$$

where V is the volume, AB is the distance between points A and B, where A and B are points located opposite of one another across from inward segment 330, where A and B are further located at the inflection point where inward segment 330 and outward segment 320 intersect; DC is the distance between points D and C, where C is the center point of cross section 305 of lobular catalyst structure 300 and D is the midpoint of the distance AB, such that DC is the distance between the center of cross section 305 of lobular catalyst structure 300 and the midpoint between two adjacent inflection points between outward segment 320 and inward segment 330 that passes through inward major radius 332; and h is the length of height 340.

The unique shape of lobular catalyst structure 300 can provide substantial increases in surface area per volume as compared to the surface area per volume of a comparable cylinder, and therefore may provide greater reaction rates. In some embodiments, the surface area per volume of lobular catalyst structure 300 is greater than 2 times the surface area per volume of a comparable cylindrical shape. Advantageously, the shape of lobular catalyst structure 300 may minimize carbons and solids deposition.

The lobular catalyst structure 300 may include a non-porous catalyst with a catalytically active material. In some embodiments, the catalytically active material includes metals. In some embodiments, lobular catalyst structure 300 includes Group 3 through Group 12 transition metals, their alloys, and combinations of the same. In one or more embodiments, the transition metal includes Fe, Ni, Pt, Mo, their alloys, and combinations of the same. In one embodiment, nickel alloys are used. The nickel alloys can include HASTELLOY-C® of Haynes Stellite Company and INCONEL® 625 of International Nickel Company Inc. Lobular catalyst structure 300 can include additives, such as aluminum, silicone, boron, gallium, indium, bismuth, carbon, calcium, sodium, and potassium. The catalytically active material can be selected based upon the concentration of corrosive or erosive materials in the feedstock or the operation conditions of the reactor to avoid possible deformation and thermal degradation. In some embodiments where the feedstock has high concentrations of corrosive materials such as chloride and sulfur, the catalytically active material include platinum. In one or more embodiments, the selection of the catalytically active material is based upon simultaneously maximizing catalytic activity and resistance to corrosion.

According to one or more embodiments, the lobular catalyst structure 300 can be fully comprised of metals, or can have a support structure. In some embodiments, the metals are cladded onto ceramic support structures. In other embodiments, metallic support structures are provided. In yet other embodiments, the lobular catalyst structure 300 includes a composition gradient, such that the surface of the catalyst is enriched with one component while the interior features higher concentrations of another component.

The thickness of the catalytically active materials, metals, or support structures of lobular catalyst structure 300 can be selected based upon feedstock properties, estimated corrosion rates, estimated erosion rates, and other factors. The weight of the metals or support structure of lobular catalyst structure 300 can similarly be selected based upon feedstock properties, estimated corrosion rates, estimated erosion rates, and other factors. Feedstocks containing corrosive materials or erosive particulates require thicker metallic layers. Additionally, the thickness of the metals or support structure of lobular catalyst structure 300 can be altered in consideration of deformation and thermal degradation, including melting and cracking cause by thermal expansion and contraction. In some embodiments, the thickness of the metals is based upon the corrosion resistance of the metals and the operational period of lobular catalyst structure 300.

Referring now generally to lobular catalysts, the lobular catalysts utilized in the embodiments described herein may feature rounded lobes in a semi-ellipsoid shape resulting in a high surface area, and maximizing the surface area available for reactions while minimizing the total space utilized by the lobular catalyst structure within the reactor. The lobular catalyst includes 2 to 5 lobes. In some embodiments, the lobular catalyst features 5 lobes, which may optimizes the surface area while preventing coke and solids deposition. According to some embodiments, the lobular catalyst does not contain more than 5 lobes, as the addition of more lobes results in higher coke and solids deposition due to the narrow curvature. The lobular catalyst structure may be a non-particulate, meaning that it is not in a particulate form, may not include particle shapes, and may not be loaded into the reactor in a bed fashion. Instead, the lobular catalyst may be a shaped, plate-like structure, formed as solid structures filling the reactor in specifically formed slab-like structures. The lobular catalyst structure may be fixed in place and mounted within a reactor. The catalyst may include a catalytically active component, which can be a transition metal. The catalyst can be used in high pressure and high temperature water processes, including in supercritical water processes, to improve heavy oil upgrading and hydrocarbon conversion in chemical processes. The catalyst may facilitate steam reforming reactions producing hydrogen, and provide active sites for cracking, isomerization, dealkylation, desulfurization, demetallization, among other reactions.

Conventional catalysts may be unable to withstand the harsh conditions of reactors utilizing water at high temperatures and high pressures, especially those at or near the supercritical conditions of water. Conventional catalysts become unstable under these harsh conditions, and can experience dissolution, disintegration, sintering, or other degradation in these conditions. Specifically, heterogeneous catalysts with catalytically active metal particles supported over substrates of alumina, silica, zeolite, or other types of supports are subject to disintegration in reactors utilizing water at high temperatures and high pressures, due to the high pressure, temperature, and water dissolution effect. Homogeneous catalysts with organometallic compounds can be inactivated in conditions where high pressure and high temperature water may be used, including supercritical water conditions. Conventional catalyst particulates may sinter under the high temperature and pressure, can become trapped within the product oil, and are difficult to separate from the product, resulting in difficulty in meeting product specifications such as conductivity and sedimentation measures. The trapped particulates can also cause erosion or corrosion of process lines and equipment, and can settle in downstream equipment, such as valves, instruments, and process lines, resulting in potential blockages and interference. Removing, separating, recovering, and recycling the conventional particulate catalyst may be also difficult, especially after sintering, and requires additional processes and equipment.

According to some embodiments, the lobular catalyst structure can sustain the harsh conditions of the reactor over an operational period, without suffering from dissolution, disintegration, or sintering, and exhibits high mechanical and structural integrity and strength. The operational period can be from 15 to 25 years with continuous regeneration of the catalyst. The operational period can be dependent upon the quantity of particulates in the feedstock to the reactor. Particulates in the feedstock can result in erosion of the lobular catalyst structure surface. Higher particulate quantities can result in higher erosion of the lobular catalyst surfaces. In some embodiments, strainers, screen, or other trap devices can be installed upstream of the lobular catalyst reactor to capture particulates and prevent the introduction of particulates into the reactor.

Referring again to FIG. 4A, lobular catalyst structure 300 may be mounted within reactor 400 via mount 370. Mount 370 may be a metal housing support fixed inside the inner walls of reactor 400 through screws, clamps, or similar mechanisms. The number of lobular catalyst structures 300 fixed within reactor 400 is generally dependent upon the size, mechanical capacity, and structural capacity of reactor 400. In some embodiments, lobular catalyst structure 300 occupies less than 25% of the total internal volume of reactor 400. In some embodiments, lobular catalyst structure 300 occupies less than 10% of the total internal volume of reactor 400. In some embodiments, the area of cross section 305 not including the area of hollow core 335 of lobular catalyst structure 300 occupies less than 15% of the total cross sectional area of reactor 400. In additional embodiments, the area of cross section 305 not including the area of hollow core 335 of lobular catalyst structure 300 occupies less than 2% of the total cross sectional area of reactor 400. The distance between each lobular catalyst structure 300 can be determined based on the volume of reactor 400, feed 355, flow velocity, carbon deposition rate, and mount 370.

According to the embodiment of FIG. 4A, feed 355 may be introduced at the bottom of reactor 400, generating an upward flow through reactor 400. Feed 355 can include hydrocarbons and water, having a composition as described with respect to mixed stream 130 in FIG. 1. Surge sump 360 allows for feed 355 to accumulate and allows for equal distribution of feedstock throughout the internal and external areas of lobular catalyst structure 300. Feed 355 may pass through reactor 400 and over the internal and external surfaces of lobular catalyst structure 300. Feed 355 may undergo reactions with water at high temperatures and high pressures in supercritical conditions.

Figure 4B:
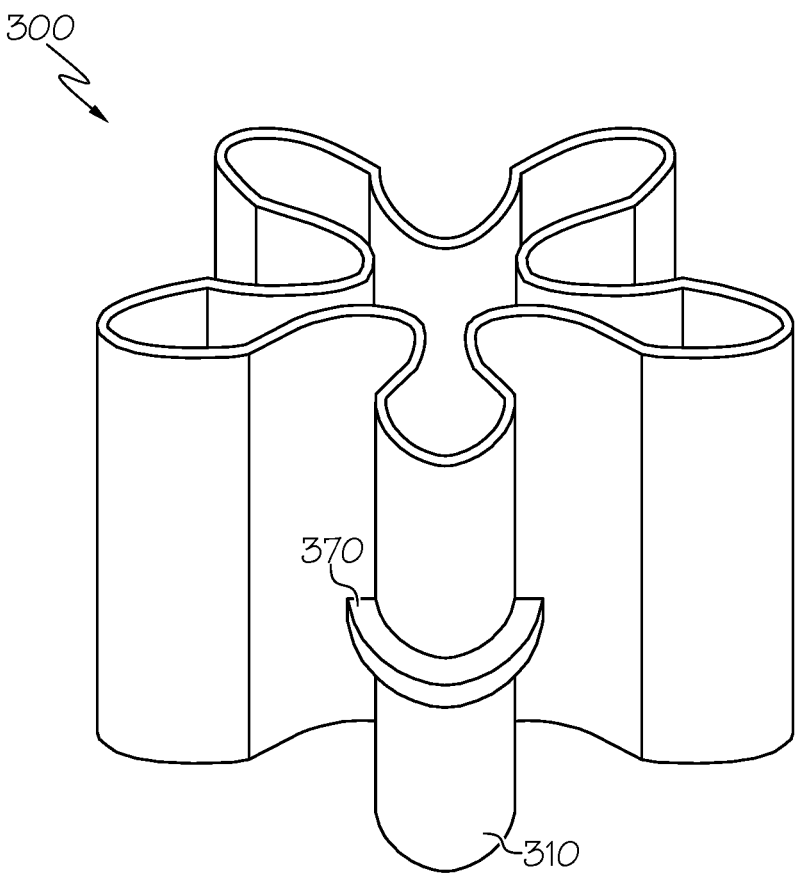
FIG. 4B is a schematic depiction of a lobular catalyst structure with a mounting bracket, according to one or more embodiment described herein.
Figure 4C:
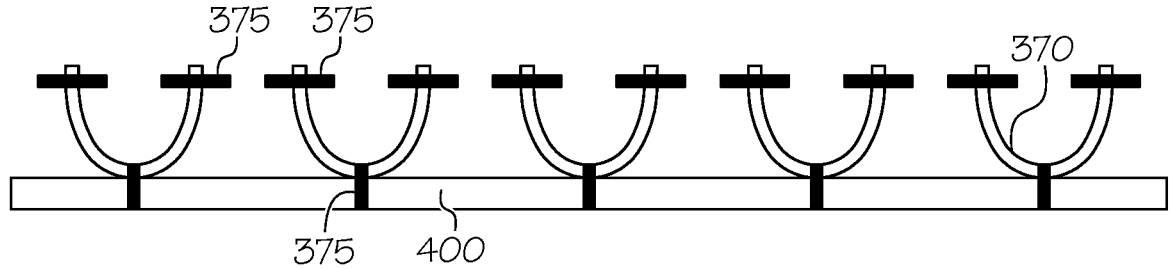
FIG. 4C is a schematic depiction of a mounting bracket, according to an embodiment, according to one or more embodiment described herein.

Referring to FIG. 4B, lobular catalyst structure 300 is shown with mount 370. Mount 370 is attached to lobe 310. Referring to FIG. 4C, mount 370 is shown. Mount 370 features screws 375 to attach mount 370 to lobe 310 of lobular catalyst structure 300 and the wall of reactor 400. Screw 375 can be any type of mechanism operable to affix mount 370 to lobe 310 or the wall of reactor 400, including clamps. In some embodiments, thermal expansion of both lobular catalyst structure 300 and mount 370 are taken into consideration when sizing both lobular catalyst structure 300 and mount 370 for reactor 400 to prevent mechanical stress, cracks, bends, or other potential damage.

Now referring again to FIG. 1, product 134 is removed from reactor 132. Product 134 can include upgraded hydrocarbons and gases including hydrogen. Generally, product 165 includes unreacted components of the hydrocarbon feed 120 (usually liquids) as well as product species from the reactions in the reactor 132.

According to embodiment described herein, the methods may convert at least 20 wt. % of the hydrocarbon feed 120 into a gas product. A gas product, as described herein, may generally include a number of gases, such as hydrogen, methane, ethane, ethylene, propane, propylene, carbon monoxide, and carbon dioxide. According to some embodiments, at least 25 wt. %, at least 30 wt. %, at least 35 wt. %, at least 40 wt. %, at least 45 wt. %, or even at least 50 wt. %, of the hydrocarbon feed 120 may be converted into a gas product. Hydrogen may be a particularly desirable gas product. According to embodiments, at least 5 wt. %, at least 7.5 wt. %. at least 10 wt. %, at least 12.5 wt. %, at least 15 wt. %, or even at least 17.5 wt. % of the hydrocarbon feed 120 may be converted into hydrogen gas. Unless otherwise stated, "hydrogen" refers to $H_2$ gas as used herein.

Referring again to FIG. 1, product 134 may be depressurized in pressure reducer 136. Pressure reducer 136 can include any type of device capable of depressurizing product 134, including depressurizing valves. Pressure reducer 136 generates depressurized product 138. Depressurized product 138 may be introduced into separator 140, which separates light products from heavy products. Separator 140 can be any type of separator operable to separate component products. Separator 140 generates light product 142 and heavy product 144. Heavy product 144 may include water and liquid hydrocarbons (non-gas products), and additionally coke. The water in heavy product 144 can be separated from heavy hydrocarbons in a downstream separator (not shown). The gas product is generally passed out of the system in the light product 142 stream, and may be de-sulfurized to remove any $H_2S$ present in the stream.

According to some embodiments, the heavy product 144 includes liquid hydrocarbons as well as solids such as coke. According to one embodiment, the liquids and solids may be separated, and the liquids may be recycled in the supercritical water system 100. For example, the liquids may be combined with mixed stream 130, or may be directly passed to the reactor 132. Such an embodiment could utilize a hydrocarbon feed and produce only solids such as coke and gas products. In another embodiment, both the liquids and solids may be recycled in the supercritical water system 100, where, for example, the totality of heavy product 144, aside from the water, is either mixed with the mixed stream 130 or is directly passed to the reactor 132.

Figure 2:
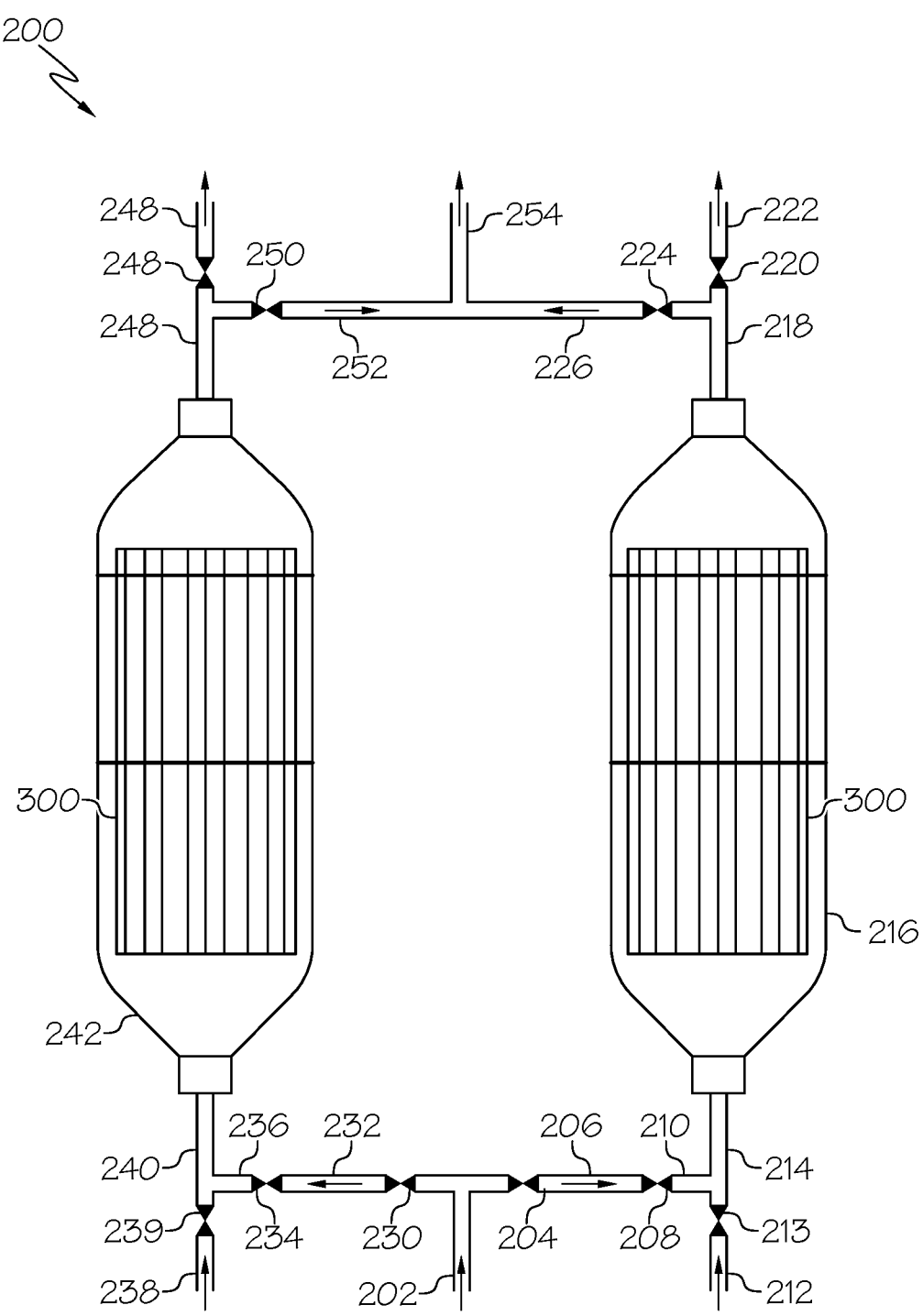
FIG. 2 is a schematic process diagram of swing reactors to allow for continuous carbon removal from the lobular catalysts inside the reactor, according to one or more embodiment described herein.

Referring now to FIG. 2, continuous carbon removal process 200 is shown, featuring an a system of swing reactors to allow for continuous carbon removal from the lobular catalyst structures inside the reactors utilizing an interconnected system of a first reactor and its associated streams and a second reactors and its associated streams. Continuous carbon removal process 200 allows for removal of carbon deposits and coke that can build up on the surfaces of lobular catalyst structure 300 without process interruption. When first valve 204 may be open and feed may not be diverted, stream 206 operates to provide mixed feed 202 to first reactor 216. However, when first reactor 216 may be isolated via valve 204 and valve 224, the system can undergo carbon removal. In this process, mixed feed 202 may be introduced in the process. Mixed feed 202 includes feed hydrocarbons and water. Mixed feed 202 can have the same or similar characteristics as mixed stream 130. While mixed feed 202 may be diverted through second valve 230, valve 204 may be closed, isolating first reactor 216. Valve 213 may be opened, allowing first air stream 212 to enter first reactor 216 via stream 214. First air stream 212 includes heated air and steam. Stream 214 may be prevented from mixing with feed 202 by first check valve 208. Stream 214 enters first reactor 216 containing lobular catalyst structure 300, which can have the same or similar characteristics as reactor 400, or supercritical water reactor 132. The hot air from first air stream 212 in stream 214 removes carbon and solid deposits from lobular catalyst structure 300. Stream 218 exits first reactor 216. When valve 224 is closed, and valve 420 is opened, flue gas 222 is removed from the system containing CO, CO2, SOx, and NOx.

While first reactor 216 is undergoing regeneration, mixed feed 202 can still be treated in the second reactor system through second reactor 242, when valve 230 and valve 250 are open, and valve 239 and valve 248 are closed. Mixed feed 202 passes through open valve 230 generating stream 232. Stream 232 passes through check valve 234 and generates stream 236, which enters second reactor 242 as stream 240. Second air stream 238, which includes heated air and steam, may be prevented from entering the system by a closed valve 239. Second reactor 242 contains lobular catalyst structure 300, which can have the same or similar characteristics as first reactor 216. Second product 248 may be removed from second reactor 242, and can have the same or similar characteristics as product 134 and product 365, or the product generated from first reactor 216 when first reactor 216 is not undergoing regeneration. Second product 244 may be prevented from exiting through second flue gas stream 248 by closed valve 246. Second product 244 may be passes through open valve 250, and exits through stream 252 and stream 254. When lobular catalyst structure 300 of first reactor 216 has been regenerated, valve 213 and 220 can be closed, and first valve 204 and valve 224 can be opened, allowing mixed feed 202 to enter first reactor 216. When second reactor 242 is regenerated, second valve 230 and valve 250 can be closed, and valve 239 and valve 246 can be opened, so that second air stream 238 can be introduced to second reactor 242. Second air stream 238 includes heated air and steam. In this way, continuous treatment of the mixed feed 202 can be performed while the catalyst in each reactor is regenerated.

EXAMPLE

The following example was generated by Aspen-HYSYS based on experimental data and based on the process configuration of FIG. 1. The feedstock was reduced crude oil ("RCO"), the contents and properties of which are shown in Table 1

TABLE 1

|  | Reduced Crude Oil |
| --- | --- |
| API Gravity | 13.8 |
| Sulfur Content (%) | 3.6 |
| Viscosity (cSt @ 50° C.) | 595 |
| Ni (ppm) | 11 |
| V (ppm) | 16.4 |
| N (ppm) | 2260 |
| Hydrogen content (wt.) | 11.1% |
| Aromatic Content (wt.) | 5.2% |
| Asphaltene (wt.) | 4.5% |
| SIMDIS | |
| Naphtha | — |
| Kerosene | — |
| Light gas Oil | — |
| Heavy Gas Oil | 7% |
| VGO | 51% |
| VR | 43% |

Feed RCO and water (demineralized water having conductivity lower than 0.1 uS/cm$^2$) at a 1:5 oil/water volume ratio were fed to the process by separated pumps at flow rate of 49 L/hr and 245 L/hr, respectively. Pumping pressure was 3,600 psig. Pressurized feed and water were pre-heated by separated heaters to reach 120° C. and 500° C., respectively. The two streams were combined and then fed to the supercritical water gasification reactor where cracking and other conversion reactions take place at 780° C. Effluent from the reactor was depressurized by a back-pressure regulator, which can be pressure control valve or capillary element or any depressurizing element, to reach 1 atm. The depressurized stream was then subjected to a separator to disengage the light and heavy products. Product properties are shown in Table 2.

TABLE 2

| Properties | | Oil Product |
| --- | --- | --- |
| Mass Flow (kg/hour) | | 48.1 (remaining is liquid/solid) |
| Gas | $H_2$ | 19.2 |
| Composition | $CH_4$ | 8.2 |
| (kg/hr) | $C_2H_6$ | 6.3 |
|  | $C_3H_8$ | 5.3 |
|  | $C_2H_4$ | 4.3 |
|  | $C_3H_6$ | 2.4 |
|  | CO | 1.0 |
|  | $CO_2$ | 1.4 |

As demonstrated by the example, the presently disclosed methods can produce gas products in relatively high amounts, such as over 50 wt. %, and can produce hydrogen is amounts such as 19.2%.

The present disclosure includes various aspects. A first aspect is a method for forming a gas product from a hydrocarbon feed, the method comprising: introducing water to a reactor, wherein the reactor comprises a lobular catalyst; introducing the hydrocarbon feed to the reactor; contacting the hydrocarbon feed, the water, and the lobular catalyst within the reactor, such that at least a portion of the hydrocarbon feed is reacted to form a gas product, wherein the water in the reactor is at a temperature and pressure such that the water is a supercritical fluid, and wherein at least 20 wt. % of the hydrocarbon feed is converted to the gas product in the reactor.

Another aspect includes the first aspect, wherein at least 5 wt. % of the hydrocarbon feed is converted to hydrogen in the reactor.

Another aspect includes the first or second aspect, wherein the gas product comprises one or more of hydrogen, methane, ethane, ethylene, propane, propylene, carbon monoxide, and carbon dioxide.

Another aspect includes any above aspect or combination of above aspects, wherein the gas product comprises all of hydrogen, methane, ethane, ethylene, propane, propylene, carbon monoxide, and carbon dioxide.

Another aspect includes any above aspect or combination of above aspects, wherein the lobular catalyst comprises: a catalyst structure, wherein the catalyst structure is a plate-structure, the catalyst structure having a cross section comprising a plurality of lobes and a hollow core, wherein each lobe comprises an outward segment and an inward segment, the outward segments and the inward segments having semi-ellipsoid cross sections; and a catalytically active component, wherein the catalytically active component is selected from group consisting of Group 3 through Group 12 transition metals, and combinations of the same.

Another aspect includes any above aspect or combination of above aspects, wherein the catalytically active component comprises nickel.

Another aspect includes any above aspect or combination of above aspects, wherein the catalyst structure consists of a catalytically active transition metal.

Another aspect includes any above aspect or combination of above aspects, wherein the lobular catalyst is mounted in a fixed position within the reactor.

Another aspect includes any above aspect or combination of above aspects, wherein the lobular catalyst comprises 5 lobes.

Another aspect includes any above aspect or combination of above aspects, wherein the lobular catalyst comprises a ceramic support structure.

Another aspect includes any above aspect or combination of above aspects, wherein the lobular catalyst is non-porous.

Another aspect includes any above aspect or combination of above aspects, wherein the hydrocarbon feed is chosen from oil, heavy hydrocarbon oils, whole range crude oil, crude oil fractions, topped crude oil, residual oil, decant oil from fluid catalytic cracking, pyrolysis oil, steam cracking process streams, conventional refinery process streams, petrochemical plant process streams, hydrocarbons from gas to liquid processes, hydrocarbons from biomass liquefaction processes, hydrocarbons from coal liquefaction processes, hydrocarbons from plastics, or combinations thereof.

Another aspect includes any above aspect or combination of above aspects, wherein the water in the reactor has a temperature of from 375° C. to 800° C.

Another aspect includes any above aspect or combination of above aspects, wherein the water in the reactor has a temperature of from 500° C. to 780° C.

Another aspect includes any above aspect or combination of above aspects, wherein the water in the reactor has a pressure of from 22 MPa to 40 MPa.

Another aspect includes any above aspect or combination of above aspects, wherein the water in the reactor has a pressure of from 25 MPa to 28 MPa.

Another aspect includes any above aspect or combination of above aspects, further comprising: removing a product from the reactor, the product comprising the gas product, a liquid hydrocarbon product, a solid hydrocarbon product, and water; and separating the gas product from the liquid hydrocarbon product, the solid hydrocarbon product, and the water.

Another aspect includes any above aspect or combination of above aspects, wherein the solid hydrocarbon product comprises coke.

Another aspect includes any above aspect or combination of above aspects, further comprising: separating the water from the liquid hydrocarbon product and the solid hydrocarbon product; and separating the solid hydrocarbon product from the liquid hydrocarbon product; and recycling at least a portion of the liquid hydrocarbon product to the reactor.

Another aspect includes any above aspect or combination of above aspects, further comprising: separating the water from the liquid hydrocarbon product and the solid hydrocarbon product; and recycling at least a portion of the liquid hydrocarbon product and at least a portion of the solid hydrocarbon product to the reactor.

The singular forms "a," "an," and "the" include plural referents, unless the context clearly dictates otherwise.

As used in the specification and in the appended claims, the words "has," "contains," and "include" and all grammatical variations thereof are each intended to have an open, non-limiting meaning that does not exclude additional elements or steps.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "propylene stream" passing from a first system component to a second system component should be understood to equivalently disclose "propylene" passing from a first system component to a second system component, and the like.

What is claimed is:

1. A method for forming a gas product from a hydrocarbon feed, the method comprising:

introducing water to a reactor, wherein the reactor comprises a lobular catalyst;

introducing the hydrocarbon feed to the reactor;

contacting the hydrocarbon feed, the water, and the lobular catalyst within the reactor, such that at least a portion of the hydrocarbon feed is reacted to form a gas product, wherein the water in the reactor is at a temperature and pressure such that the water is a supercritical fluid, and wherein at least 20 wt. % of the hydrocarbon feed is converted to the gas product in the reactor; and wherein the lobular catalyst is not a particulate.

2. The method of claim 1, wherein at least 5 wt. % of the hydrocarbon feed is converted to hydrogen in the reactor.

3. The method of claim 1, wherein the gas product comprises one or more of hydrogen, methane, ethane, ethylene, propane, propylene, carbon monoxide, and carbon dioxide.

4. The method of claim 1, wherein the gas product comprises all of hydrogen, methane, ethane, ethylene, propane, propylene, carbon monoxide, and carbon dioxide.

5. The method of claim 1, wherein the lobular catalyst comprises:

a catalyst structure, wherein the catalyst structure is a plate-structure, the catalyst structure having a cross section comprising a plurality of lobes and a hollow core, wherein each lobe comprises an outward segment and an inward segment, the outward segments and the inward segments having semi-ellipsoid cross sections; and a catalytically active component, wherein the catalytically active component is selected from group consisting of Group 3 through Group 12 transition metals, and combinations of the same.

6. The method of claim 5, wherein the catalytically active component comprises nickel.

7. The method of claim 5, wherein the catalyst structure consists of a catalytically active transition metal.

8. The method of claim 1, wherein the lobular catalyst is mounted in a fixed position within the reactor.

9. The method of claim 1, wherein the lobular catalyst comprises 5 lobes.

10. The method of claim 1, wherein the lobular catalyst comprises a ceramic support structure.

11. The method of claim 1, wherein the lobular catalyst is non-porous.

12. The method of claim 1, wherein the hydrocarbon feed is chosen from oil, heavy hydrocarbon oils, whole range crude oil, crude oil fractions, topped crude oil, residual oil, decant oil from fluid catalytic cracking, pyrolysis oil, steam cracking process streams, conventional refinery process streams, petrochemical plant process streams, hydrocarbons from gas to liquid processes, hydrocarbons from biomass liquefaction processes, hydrocarbons from coal liquefaction processes, hydrocarbons from plastics, or combinations thereof.

13. The method of claim 1, wherein the water in the reactor has a temperature of from 375° C. to 800° C.

14. The method of claim 1, wherein the water in the reactor has a temperature of from 500° C. to 780° C.

15. The method of claim 1, wherein the water in the reactor has a pressure of from 22 MPa to 40 MPa.

16. The method of claim 1, wherein the water in the reactor has a pressure of from 25 MPa to 28 MPa.

17. The method of claim 1, further comprising:

removing a product from the reactor, the product comprising the gas product, a liquid hydrocarbon product, a solid hydrocarbon product, and water; and separating the gas product from the liquid hydrocarbon product, the solid hydrocarbon product, and the water.

18. The method of claim 17, wherein the solid hydrocarbon product comprises coke.

19. The method of claim 17, further comprising:

separating the water from the liquid hydrocarbon product and the solid hydrocarbon product; and separating the solid hydrocarbon product from the liquid hydrocarbon product; and recycling at least a portion of the liquid hydrocarbon product to the reactor.

20. The method of claim 17, further comprising:

separating the water from the liquid hydrocarbon product and the solid hydrocarbon product; and recycling at least a portion of the liquid hydrocarbon product and at least a portion of the solid hydrocarbon product to the reactor.

21. The method of claim 1, wherein the lobular catalyst has a height that is approximately equal to the height of the widest or tallest portion of the reactor.

* * * * *